US012592569B2

(12) United States Patent
Eilertsen

(10) Patent No.: US 12,592,569 B2
(45) Date of Patent: Mar. 31, 2026

(54) MOBILE HYBRID GENERATOR SYSTEM FOR PROVIDING ELECTRICAL POWER

(71) Applicant: HYBRIDGENERATOR APS, Årslev (DK)

(72) Inventor: Rune Eilertsen, Årslev (DK)

(73) Assignee: HYBRIDGENERATOR APS, Årslev (DK)

( * ) Notice: Subject to any disclaimer, the term of this patent is extended or adjusted under 35 U.S.C. 154(b) by 379 days.

(21) Appl. No.: 18/250,561

(22) PCT Filed: Oct. 28, 2021

(86) PCT No.: PCT/EP2021/080066
§ 371 (c)(1),
(2) Date: Apr. 26, 2023

(87) PCT Pub. No.: WO2022/090432
PCT Pub. Date: May 5, 2022

(65) Prior Publication Data
US 2023/0411968 A1 Dec. 21, 2023

(30) Foreign Application Priority Data
Oct. 28, 2020 (EP) ..................................... 20204351

(51) Int. Cl.
*H02J 3/46* (2006.01)
*H02J 3/38* (2006.01)
(Continued)

(52) U.S. Cl.
CPC .............. *H02J 3/466* (2020.01); *H02J 3/388* (2020.01)

(58) Field of Classification Search
CPC .................................. H02J 3/456; H02J 3/388
(Continued)

(56) References Cited

U.S. PATENT DOCUMENTS 10,389,121 B1 * 8/2019 Sherry ..................... H02J 3/02
10,790,670 B1 9/2020 Alimadad
(Continued)

FOREIGN PATENT DOCUMENTS

| CN | 111164791 A | 5/2020 |
|---|---|---|
| GB | 2434928 A | 8/2007 |

(Continued)

*Primary Examiner* — Md Azad
(74) *Attorney, Agent, or Firm* — Dinsmore & Shohl LLP

(57) ABSTRACT

A mobile hybrid generator system is for providing grid-like AC power output to a load at off-grid locations. Also, a tracked vehicle may include the hybrid generator system as a power supply system. A mobile hybrid generator system for providing grid-like AC power output to a load at off-grid locations may include a housing accommodating: a rechargeable electrical energy storage unit, such as a battery, configured to provide a DC power output, at least a first primary energy source, such as a combustion engine, for charging the rechargeable energy storage unit, and an inverter unit configured for converting the DC power output from the rechargeable energy storage unit to the grid-like AC power output, wherein the mobile hybrid generator is configured such that the grid-like AC power output is provided only from the inverter unit, both during normal mode operation and during peak power operation.

24 Claims, 6 Drawing Sheets

(51) Int. Cl.
    *H02J 3/388*        (2026.01)
    *H02J 3/466*        (2026.01)

(58) Field of Classification Search
    USPC ........................................................ 700/297
    See application file for complete search history.

(56)               References Cited

U.S. PATENT DOCUMENTS

| | | | |
|---|---|---|---|
| 11,444,464 B1 * | 9/2022 | Ford | ....................... H02S 40/38 |
| 2003/0030281 A1 * | 2/2003 | Campion | ................. H02P 9/04 |
| | | | 290/1 R |
| 2005/0085400 A1 | 4/2005 | Tan | |
| 2005/0218657 A1 | 10/2005 | Weesner et al. | |
| 2013/0041514 A1 | 2/2013 | Apalanek et al. | |
| 2014/0277791 A1 * | 9/2014 | Lenard | .................... F02D 29/06 |
| | | | 700/287 |
| 2024/0047991 A1 * | 2/2024 | Caamano | ................ H02J 7/007 |

FOREIGN PATENT DOCUMENTS

| | | | |
|---|---|---|---|
| GB | 2493631 A | 2/2013 |
| WO | 2005119877 A1 | 12/2005 |
| WO | 2014033467 A2 | 3/2014 |
| WO | 2019014691 A1 | 1/2019 |

* cited by examiner

MOBILE HYBRID GENERATOR SYSTEM FOR PROVIDING ELECTRICAL POWER

CROSS-REFERENCE TO RELATED APPLICATIONS

This application is the U.S. National Stage of PCT/EP2021/080066 filed on Oct. 28, 2021, which claims priority to European Patent Application 20204351.9 filed on Oct. 28, 2020, the entire content of both are incorporated herein by reference in their entirety.

FIELD OF THE INVENTION

The present disclosure relates to a mobile hybrid generator system for providing grid-like AC power output to a load at off-grid locations. The present disclosure further relates to a tracked vehicle comprising the present hybrid generator system a power supply system.

BACKGROUND OF THE INVENTION

Power supply systems are known from the prior art, which are used in particular in areas, where no power supply is guaranteed via the power grid, for example on construction sites, for testing wind turbines before grid connection, remote fish farms, in remote areas or when the power supply has failed, in order to supply a variety of devices with electricity autonomously or independently of the grid. These power supply systems essentially have a generator which is driven by an internal combustion engine, in particular a gasoline or diesel engine. The devices to be operated can be connected to the generator and operated thereby.

A disadvantage of the known power supply systems is that in the combustion engines used, the energy value contained in fossil fuels can be converted into electrical energy only to a small extent. This ratio of consumed output energy to electrical energy further deteriorates when the engine cannot operate in the optimum power range. The low energy conversion efficiency results in a high demand for fuel, which creates deployment efforts and high costs. Furthermore, unnecessarily emissions, in particular exhaust gases are released to the environment.

To counter these disadvantages in part, systems are known from the prior art, in which the generator is connected to a DC intermediate circuit, via a rectifier and thereby supplies an electric energy storage device with power, as so called hybrid power supply system because it is a hybrid between a traditional generator based power supply system and an energy storage power supply system, aka a hybrid generator. Such hybrid systems makes it possible to operate the generator at a better operating point. A disadvantage of these systems is the limitation of the maximum load by the capacity of the energy storage. The electrical energy storage must therefore be sized relatively large. Furthermore, especially in peak load operation, considerable conversion losses occur due to the interposition of a DC buffer between the generator and the load. As a result, the overall efficiency of the system is significantly reduced.

In the prior art (cf. WI 2014/033467 and WO 2019/014691) this issue has been handled by switching between first and second operating modes of the power supply system, wherein in the first operating mode the energy generated in the generator is supplied to the DC intermediate circuit and thus in particular to the rechargeable electrical energy storage, and supplied subsequently from there via the inverter to the load. The first operating mode is used under normal load conditions. In the second operating mode the generator and the inverter are connected in parallel, so that the load is supplied directly with energy both from the DC intermediate circuit (and the rechargeable electrical energy storage) and the generator. A control device which regulates the generator in dependence on the load of the electrical load is provided. As a result, the output power can be increased and peak loads can be compensated in the second operating mode. By providing the possibility of switching between these two modes, it has been possible to dimension the generator smaller, since at peak loads the power supply is ensured by the interaction between the generator and DC intermediate circuit rather than the generator or the DC intermediate circuit having to uphold the power supply on their own. Furthermore, the generator can be switched off, for example during repair or maintenance work, but only very temporarily, because the generator needs to be ready for the peak load requirement. The result is that the internal combustion engine will be running almost constantly, at least in idle mode, with air and noise pollution as the result. A purpose of the present disclosure is to further optimize operation of a hybrid generator system.

SUMMARY OF THE INVENTION

The present disclosure relates to a mobile hybrid generator system for providing (grid-like) AC power output to a load at off-grid locations which can be controlled such that much reduced fossil fuel consumption can be realized—and with much better quality of the delivered electricity. In general the presently disclosed hybrid generator system comprises a rechargeable electrical energy storage unit, such as a battery, typically configured to provide a DC power output. At least a first primary energy source may be provided, such as an (combustion) engine, for charging the rechargeable energy storage unit, and an inverter unit configured for converting the DC power output from the rechargeable energy storage unit to the AC power output for the load. These components can be accommodated in a housing. A key feature is that the presently mobile hybrid generator system preferably is configured and dimensioned such that the AC power output is provided only from the inverter unit, both during normal mode operation and during peak power operation, i.e. pure inverter based operation can be provided at all times. I.e. the presently mobile hybrid generator system is preferably configured and dimensioned such that the AC power output is provided only from the rechargeable energy storage unit via the inverter unit, both during normal mode operation and during peak power operation.

Grid-like AC power is 50 Hz or 60 Hz, 110/120/220/240/400 V AC, typically three-phase. The presently disclosed hybrid generator system is preferably rated at at least 50 kVA, more preferably at least 75 kVA, most preferably at least 90 or even at least 100 kVA, three phases.

As long at the generator+engine is connected directly to the output (possibly via an inverter), the power factor is an issue. When a power requirement is created by the load, the generator must be able to react to it. The generator itself is normally capable of doing that but the engine side of the unit is typically not sized to be able to deliver the horsepower (kW) to permit the generator to carry the load at the rated speed under all conditions. The industry standard for generators is for them to be rated for up to a 0.8 power factor. I.e. a 140 kVA traditional generator with a power factor of 0.8 can provide 0.8×140=112 kW, which corresponds to a peak power capacity of approx. 140 kW for a few seconds.

Taking the power factor into account the engine in a traditional generator is over-dimensioned because also the engine must be dimensioned for peak power requirements, even though the normal mode operations specifications are much lower than peak power requirements.

The present inventor has realized that with pure inverter based operation the power factor issue, usually associated with generators, is much less of an issue, i.e. by dimensioning the inverter unit of the presently disclosed hybrid generator system for the peak load requirements, much can be gained. In that regard it is noted that a 90 kVA inverter unit can provide a power output of 180 kW for a few seconds with a suitable dimensioned battery. With the inverter unit in itself being able to handle the peak power requirement, and if an engine is used as the primary energy source, the engine can be dimensioned for the normal mode operation, i.e. a much smaller and engine is required and the engine can be operated only temporarily such that fuel efficiency and engine efficiency can be optimized. Under typical loading conditions the load can be provided from the rechargeable energy source, and as the engine is only used for charging the rechargeable energy source, operation of the engine can be reduced to a few hours per day—which should be compared to close to 24 hour engine operation, even with state of the art hybrid generator systems.

DETAILED DESCRIPTION OF THE INVENTION

Figure 1:
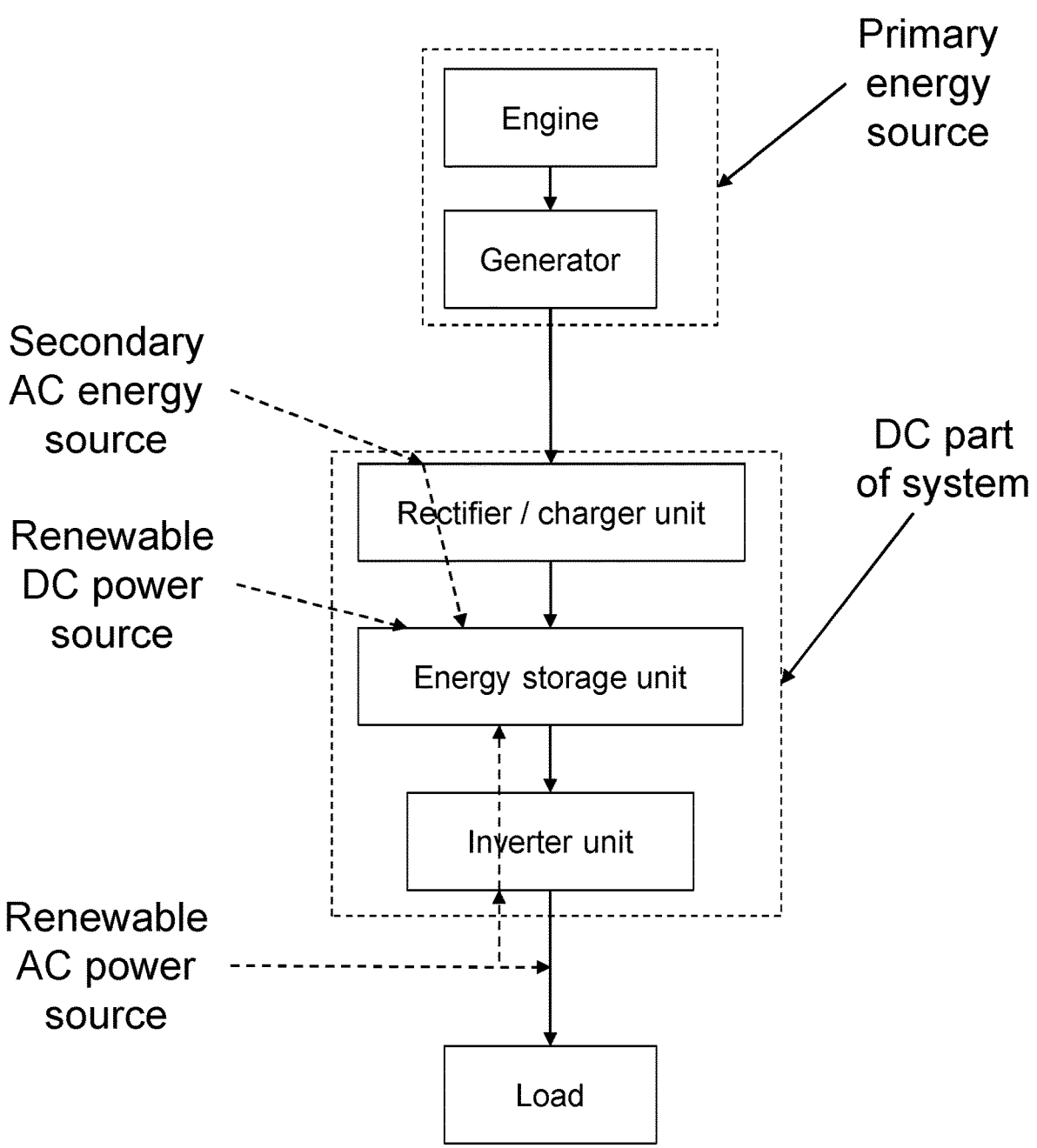
FIGS. 1 and 1A shows schematic overviews of embodiments of the presently disclosed hybrid generator system.

The presently disclosed hybrid generator system is preferably configured such that output from the primary energy source is only used to charge the rechargeable energy storage unit—in that case the output from the primary energy source cannot be used for the load. I.e. typically there is no direct connection between the primary energy source and the inverter unit, in that case they are only connected through the rechargeable energy storage unit.

The presently disclosed hybrid generator system is preferably further configured to control start and stop of charging of the rechargeable energy storage unit by the primary energy source based on a power status of the rechargeable energy storage unit. I.e. in the preferred embodiment it is the status of the rechargeable energy storage unit, i.e. how much electrical power is left, which determines whether charging from the primary energy source shall take place. With an engine as the primary energy source, this means that the engine should only start when charging of the rechargeable energy storage unit is required. I.e. the system may be provided with a lower limit of the remaining electrical power of rechargeable energy storage unit—when the lower limit is reached charging begins. A lower limit can be around 20-40% of the maximum power. This lower limit may be situation dependent, i.e. during night time the lower limit may be reduced further, i.e. to less than 20% to maintain silent mode of the hybrid generator system during night time. In other situations the lower limit may be increased, i.e. when the ambient temperature of the hybrid generator system is low, e.g. below freezing temperature, the lower limit may be increased, possibly around 40-50% of the maximum power. I.e. usually charging of the rechargeable energy storage unit is only determined by the power remaining in the storage unit—and possibly external factors such as time of day and ambient temperature—but typically not the current load requirements. Hence, in case of an engine as the primary energy source, the engine is running completely independent of the load requirements. However, in case of the rechargeable energy storage unit being close to the lower limit, e.g. being within 5-20% percentage points from the lower limit, and the load being above a certain limit, the system may be configured to charge the rechargeable energy storage unit during this certain load requirement.

As also indicated above the inverter unit is preferably configured such that the maximum AC power output from the inverter unit matches a peak power requirement of the load. In that regard the inverter units is preferably modularized, i.e. comprises a plurality of inverters, such as a plurality of 10 KVA inverters, such that the peak power requirements of a load can be provided by a suitable number of inverters in a modular setup.

Correspondingly the maximum power output of the primary energy source, such as an engine, is preferably configured to match a normal mode requirement of the load. This is in contrast to prior art generators where the engine is dimensioned to match the peak power requirement of the load—and even take the power factor into account.

Dimensioning and configuration of the rechargeable energy storage unit depends on other factors. It should match the peak power requirement from the inverter unit, but that is usually not an issue. A larger battery is more heavier and makes the presently disclosed hybrid generator system less mobile—but a large battery also requires fewer charging cycles such that silent mode of the present hybrid generator system can be upheld for longer periods. The lifetime of a battery is typically defined in terms of charging cycle, i.e. how many charges are possible—and how are these charging cycles defined. In that regard the dimensioning and configuration of the rechargeable energy storage unit can be determined by a required lifetime of the battery.

In the preferred embodiment the DC side of the presently disclosed hybrid generator system, including the rechargeable energy storage unit, is low-voltage, typically less than 50 V, such as 48 V.

The at least first primary energy source may be an engine, e.g. a combustion engine, preferably an integral engine, powered by fluid fuel, such as gasoline, diesel, methanol, biofuel, gas, hydrogen, etc., or a (hydrogen) fuel cell unit. I.e. a source of energy not relying a renewables, like sun, wind, waves, etc. The presently disclosed hybrid generator system is preferably configured for starting the engine a time period, e.g. 1-5 minutes, before charging of the rechargeable storage unit begins, such that the engine is warmed up before load of the engine begins. It may not be a predefined period, but may be based on a temperature measurement of the engine. In that way the engine is not loaded before it is warm.

Along with an engine comes a generator unit driven by the engine for generating AC or DC power. In case of an AC generator a rectifier unit is provided for converting the AC power from the generator unit to DC power for charging the rechargeable energy storage unit. In case of a DC generator a rectifier unit is not needed and with an appropriate selection of a DC generator, e.g. a low-voltage DC generator, the primary energy source can directly charge the rechargeable energy storage unit.

A major advantage of decoupling the primary energy source from the load, is that the primary energy source can be operated completely independently, e.g. in terms of AC power frequency. AC power output is usually provided at around 50 Hz. If the engine+generator is connected to the load, 50 Hz requires an engine speed of around 1500 RPM with a four pole generator. But a typical diesel engine does not operate efficiently at 1500 RPM. The primary energy source of the presently disclosed hybrid generator can be operated independently of the load, such that in case of a primary AC power source, the frequency of the AC power output from the primary energy source can be different than the frequency require of the AC load. In case of an engine, 60 Hz AC power can be provided from around 1800 RPM, which is much more efficient for a diesel engine. As the engine is integral it can be incorporated in the housing configured such that the air intake to the engine is provided around the location of the inverter unit and the rechargeable energy storage unit, such that a flow of air is provided around the inverter unit and the rechargeable energy storage unit when the engine is running which can be used as a cooling source for the inverter unit and the rechargeable energy storage unit.

If an appropriate DC generator is used the operation of the engine can be even more optimized because the RPM of the engine will then only determine the power output from the DC generator, whereas the voltage output from the DC generator can be constant and independent of the RPM of the engine.

A fuel tank, for holding fluid or liquid fuel, is preferably integrated in the housing, the fuel tank preferably configured for holding at least 500 or 750 litres of fuel. In practice this means that the presently disclosed hybrid generator system dimensioned to replace a 140 KVA traditional generator, can deliver stable electrical power for weeks without needing refuelling.

The presently disclosed hybrid generator system may also be configured to supplement and boost existing AC grid connection. I.e. at construction sites there may be an AC grid connection/outlet, which is not dimensioned to the maximum load requirement at the site. The existing AC grid connection can then be seen as at least a second primary energy source connected to the AC side of a rectifier unit and used to charge the rechargeable energy storage unit. The maximum load requirement of the construction site can now be matched by the present hybrid generator system. If the load requirement for a time period is more than the AC grid connection can provide to the rechargeable energy storage unit, such that the rechargeable energy storage unit is discharged, the primary energy source can supplement the secondary energy source in form of the grid connection.

In the preferred embodiment the rechargeable energy storage unit is a battery unit, such as a lithium-ion battery unit, such as a lithium iron phosphate battery (LiFePO 4) battery unit, preferably a lithium-titanate (LTO) battery unit. As mobility is an issue with mobile generator systems, LTO batteries are not the obvious choice for the presently disclosed because the energy density of LTO batteries because a disadvantage of lithium-titanate batteries is that they have a lower inherent voltage of 2.4 V, which leads to a lower specific energy of about 30-110 Wh/kg) than conventional lithium-ion battery technologies, which have an inherent voltage of 3.7 V. The lithium-titanate nano-crystals on the surface of the anode of a LTO battery provides the anode a surface area of as high as about 100 square meters per gram, allowing electrons to enter and leave the anode quickly. This makes fast recharging possible and provides high currents when needed, and thereby the ability to deliver energy over an extremely short period, i.e. an LTO battery can better match the peak power requirements of the load such that the AC power output is only inverter based on not dependent on the primary energy source. Furthermore, LTO batteries provides for very high thermal stability and long lifespan and can be warranted for 20 years or 22,000 cycles.

The presently disclosed hybrid generator system may advantageously be configured for integrating a renewable AC power source, preferably at the AC power output side of the inverter unit, i.e. a wind turbine facility or a AC solar cell unit. Such a renewable AC power source is per definition unstable and the presently disclosed hybrid generator system can be used to provide the necessary stability. The advantage of integrating a renewable AC power source at the AC side of the inverter unit is that the power from the renewable AC power source can be used directly for the load which is more efficient in terms of conversion loss. The presently disclosed hybrid generator system may then also be configured such that when surplus AC power is provided from the renewable AC power source, this surplus AC power can be directed through the inverter unit, i.e. converted to DC power and then used to charge the rechargeable energy storage unit. I.e. when the requirements from the load is less than the power output from the renewable AC power source, surplus power can be used to charge the rechargeable power storage unit.

On the other hand: If a renewable DC power source is available, for example a DC solar power source, it is more advantageously to integrate it at the input of the rechargeable power storage unit for charging the rechargeable power storage unit, because then DC power is readily available.

A renewable power source, either DC or AC, may even be part of the presently disclosed hybrid generator system, e.g. a solar power source mounted on the roof of the housing.

The housing of the presently disclosed hybrid generator system is preferably primarily manufactured in plastics, such as thermoplastics, such as high density polyethylene. The main advantage is that it is lightweight, solid and most importantly: is electrically insulating. The housing can be manufactured by cutting, milling and/or punching large plates of thermoplastics in suitable parts and weld them together to form the housing, much like working in steel, but with a lightweight electrically insulating housing as the result. The thermoplastic plates used for the housing can be a combination of 1) low cost solid plates that can we welded together, e.g. for forming partitions in the housing and for attaching for various components, and 2) more expensive sandwich plates for the larger sides of the housing, with integrated cavities such that sandwich plates have lower weight, better sound absorbing properties and better shock-absorbing properties. I.e. a thermoplastic housing can be cut, formed, milled, welded and worked like metal but the advantages is that it works as an insulator, has lower weight, better sound absorbing properties, better shock absorbing properties, can be made of recycled material and can also be recycled after use. All in all a more energy efficient and environmentally friendly solution.

The presently disclosed hybrid generator system is preferably mobile, a self-contained transportable plug-and-play system which can be transported to remote places and deliver grid-like electrical AC power. A wheeled chassis, such as a trailer, may be provided for holding the housing, i.e. for holding the entire hybrid generator system, thereby providing the mobility. The presently disclosed hybrid generator system with a 90 kVA inverter unit, a 50 kVA primary energy source in the form of an integral 3 liter, 4 cylinder diesel combustion engine+generator, a 36 kWh 48 V LTO battery unit, a 40 kW rectifier unit and a fuel tank for holding 750 litres of diesel, can replace a traditional 140 kVA generator. The weight of such a unit (including a trailer) can be kept under 3000 kg, even with full fuel tank, such that the hybrid generator system with trailer can be towed by a car and not necessarily a truck. Thereby even very remote locations can be easily reached at low transportation costs. With 750 litres of diesel weeks of operation can be achieved without refuelling and the engine will typically only need to run one to two times a day for few hours for recharging the battery. This is in comparison to the traditional 140 kVA generator with an engine running 24/7 and which must typically be refuelled every 3 days, and serviced several times of the year, i.e. less fossil fuel pollution and less noise with the presently disclosed hybrid system. As the engine can be operated at much more optimal conditions, lifetime and service intervals of the engine are much longer than for traditional generators.

The presently disclosed hybrid generator system maybe network/cloud connected via a modem and/or router such that it can be monitored and controlled online and remotely.

In a further embodiment the at least first primary energy source comprises at least one DC voltage generator, such that the output from the first primary energy source is DC power. The DC voltage generator can for example be a permanent magnet assisted synchronous reluctance motor used as generator. As with a AC generator the DC voltage generator may be driven by a combustion engine. The DC voltage generator may advantageously be configured to provide an output voltage of less than 100 Volts DC, preferably less than 75 Volts DC, more preferably less than 50 Volts DC, most preferably 48 Volts DC. In such case the voltage output from the DC generator can be selected to match the voltage input of the rechargeable energy storage unit such that the system can be simplified. I.e. the DC power output from the primary energy source may be configured for direct charging of the rechargeable electrical energy storage unit, i.e. preferably without a rectifier. A low DC voltage of sub 50 V at the output of the DC voltage generator is also much safer than a 400 Volts AC Voltage at the output of an AC generator. Therefore care for some security measures, such as providing an earth wire coupled for example to metallic touch parts, are not strictly compulsory for the power source, which simplifies the design of the system.

With a DC generator it becomes even more important that the inverter unit is dimensioned for peak power requirement of the load, because with a DC voltage generator the primary energy source cannot drive the AC load directly.

The DC voltage generator is preferably a low-voltage DC voltage generator, such as a permanent magnet assisted synchronous reluctance motor, preferably relying on stator cage technology. One example is the Molabo ISCAD (Intelligent Stator Cage Drive) V50 motor, in this case used as a generator, which has a weight of only 45 kg. A low weight of the generator and avoiding the rectifier unit can provide a saving of several hundred kilos compared to a typical AC generator solution.

Avoiding the power loss in a rectifier will further improve the efficiency of the system and also save weight. Low weight is an important factor of these systems because they are mobile and are typically be transported on a trailer. It is much convenient to have a total weight below 3000 Kg in order to be able to transport the trailer with a car. Reducing further the total weight of the power source is very advantageous because it allows to use a larger fuel tank and therefore allows a longer autonomous working time-spam of the hybrid generator. Alternatively, a lower weight power source allows a lighter trailer, possibly also smaller in size and therefore easier to transport and more environmentally friendly.

Efficiency is another important factor for a mobile hybrid generator because a more efficient hybrid generator allows for lower fuel consumption per outputted Watt, yielding a longer autonomous working time for a given fuel tank, a smaller impact on the environment and a reduced cost of the fuel for a given working time.

The DC voltage generator may be configured for providing a constant nominal power output of at least 30 kW, more preferably at least 35 kW, even more preferably at least 45 kW, most preferably at least 50 kW. The DC voltage generator may further be configured for providing a peak power output of at least 45 kW, more preferably at least 50 kW, even more preferably at least 70 kW, most preferably at least 80 kW. This may provide for constant charging of the rechargeable energy storage unit with a power of at least 30 kW, more preferably at least 35 kW, typically 37 kW of charging power delivered to the storage unit, and a peak power charging at 50 kW of charging power delivered to the storage unit.

In case of a combustion engine and an AC voltage generator, the required speed of the combustion engine is tied to the frequency of the AC generator, e.g. a speed of about 1850 rpm is near optimal for an AC frequency of 60 Hz. But with a DC generator the operation of the engine can be even more optimized because the RPM of the engine will then only determine the power output from the DC generator, whereas the voltage output from the DC generator can be constant and independent of the RPM of the engine. I.e. the combustion engine may be operated at a speed/RPM which is most efficient for the combustion engine, the DC voltage generator and/or the rechargeable energy storage unit. In particular the RPM of the combustion engine may be adjusted depending on the needed time for recharge of the energy storage unit. This feature brings the desirable effect that a shorter recharge time may be achieved when needed by the application. If for example noise of the engine is an issue, the engine can be operated at higher RPM providing a higher output power of the DC voltage generator such that the rechargeable energy storage unit can be fully charger faster. The 140 kVa hybrid generator exemplified herein can for example provide 24 hour normal operation and only need on the order of 2 hours of engine operation per day if the battery is charged at peak power. On the other hand the engine can alternatively be operated at an RPM the provides the maximum fuel efficiency, e.g. at around 2600 RPM, yielding a lower fuel consumption per output Watt, with desirable effect of a longer duration of the autonomous working time of the system for a given fuel tank, desirable effect of lower environmental impact per Watt, and desirable effect of shorter charging time of the energy storage element for a given energy storage capacity.

Further weight reductions of the presently disclosed system can be by making the trailer in aluminium—prior art trailers are typically made in steel—which may reduce the weight of the entire system by approx. 100 kg.

The housing of presently disclosed system may further be provided with large grooves in the bottom for matching the fork of a fork lift truck such that the entire housing can be lifted for semi-permanent operation, i.e. still transportable by a trailer but it is possible to lift the system for a more permanent operation thereby not using the trailer.

EXAMPLES

FIG. 1 shows a schematic overview of one embodiment of the presently disclosed hybrid generator system, an embodiment where the primary energy source is a traditional combustion engine+a generator, the engine drives the generator and the generator converts the engine's mechanical energy to electrical energy (AC). The charger/rectifier unit converts the power from AC to DC, charges the battery and ensures the current does not run "backwards" towards the generator. The energy storage unit in the form of a battery unit battery stores the electrical energy. An inverter unit converts the DC power from the battery to grid-like AC power, e.g. 50 Hz or 60 Hz, 220/240/400 V AC.

Figure 1A:
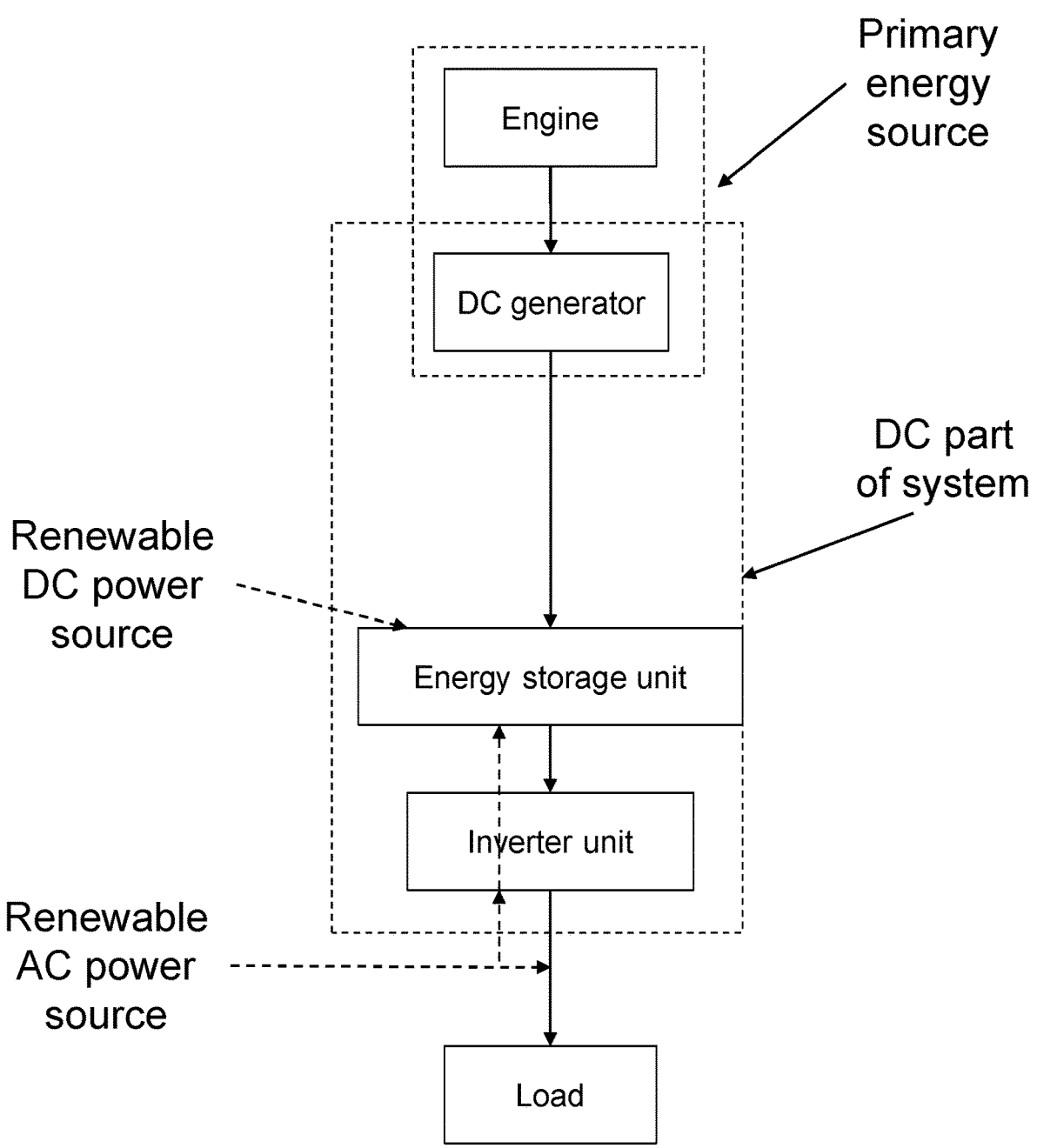

FIG. 1A is similar to FIG. 1, but with a DC generator replacing the AC generator+rectifier. FIG. 1A shows a schematic overview of one embodiment of the presently disclosed hybrid generator system, an embodiment where the primary energy source is a traditional combustion engine+a DC generator, the engine drives the DC generator and the generator converts the engine's mechanical energy to electrical energy (DC). The DC power output can charge the battery directly, i.e. no need for a rectifier unit. The energy storage unit in the form of a battery unit battery stores the electrical energy. An inverter unit converts the DC power from the battery to grid-like AC power, e.g. 50 Hz or 60 Hz, 220/240/400 V AC.

In both FIG. 1 and FIG. 1A the load is the "client", e.g. an off-grid wind turbine under construction, that receives the power. The load is specified with a peak power requirement and a normal mode requirement and possibly an idle mode requirement and the presently disclosed hybrid generator is typically specified/configured to match those load requirements.

The DC parts of the presently disclosed hybrid generator system form a major part of the system. In case of an AC generator it is the rectifier unit, the energy storage unit and the inverter unit (even though the rectifier unit has an AC input and the inverter unit has an AC side), in case of a DC generator even more components are DC, such that most of the internal electrical connections can be low-voltage DC, i.e. quite safe.

As illustrated in FIG. 1, and as also explained previously, a secondary AC source can be connected to the rectifier unit, a renewable DC power source can be connected via the DC side of the rectifier unit and a renewable AC power source can be connected to the AC side of the inverter unit. Surplus power from the renewable AC power source can be routed to the rechargeable energy storage unit via the inverter.

Figure 2:
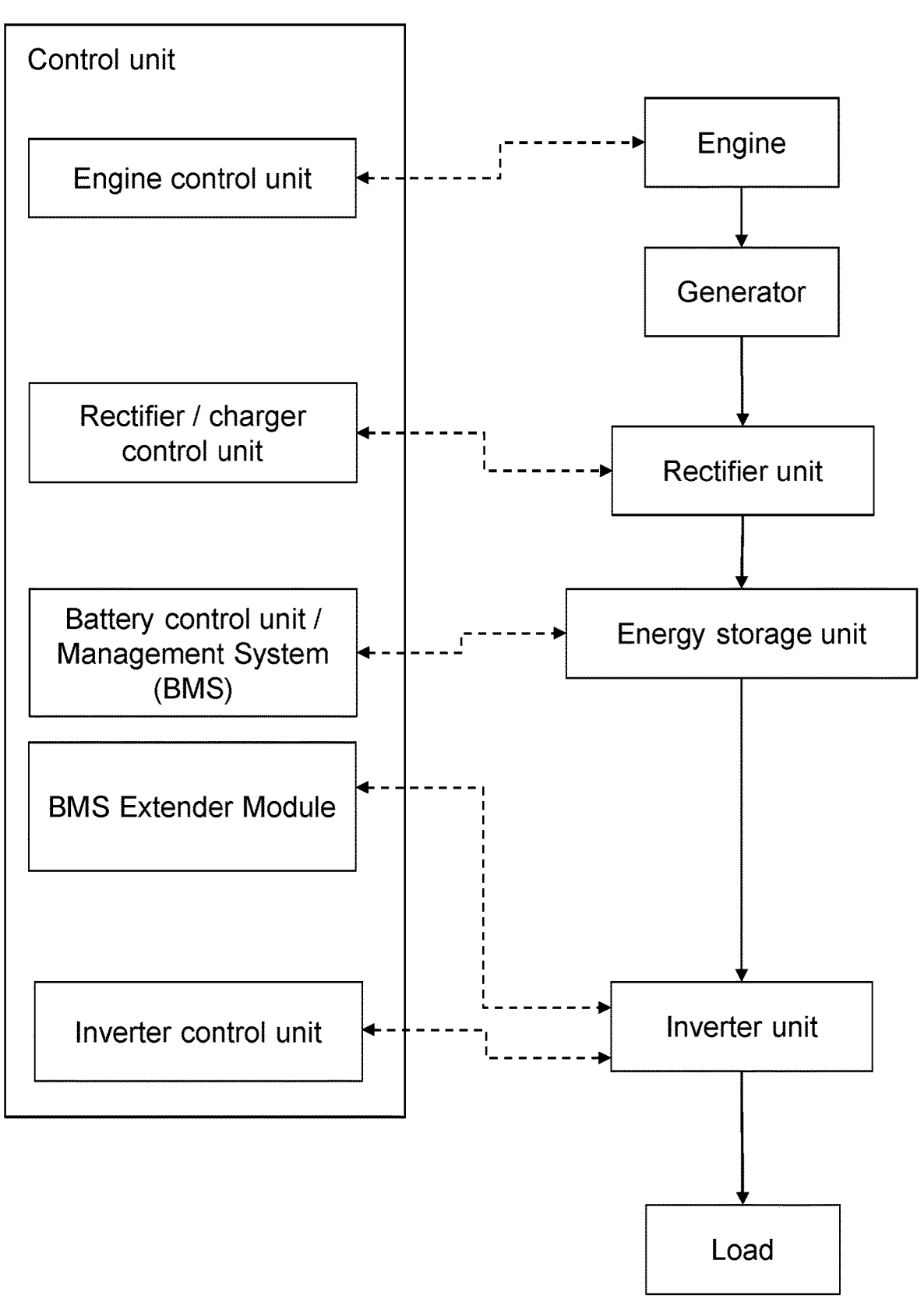
FIGS. 2 and 2A show schematic overviews, including control units, of embodiments of the presently disclosed hybrid generator system.
Figure 2A:
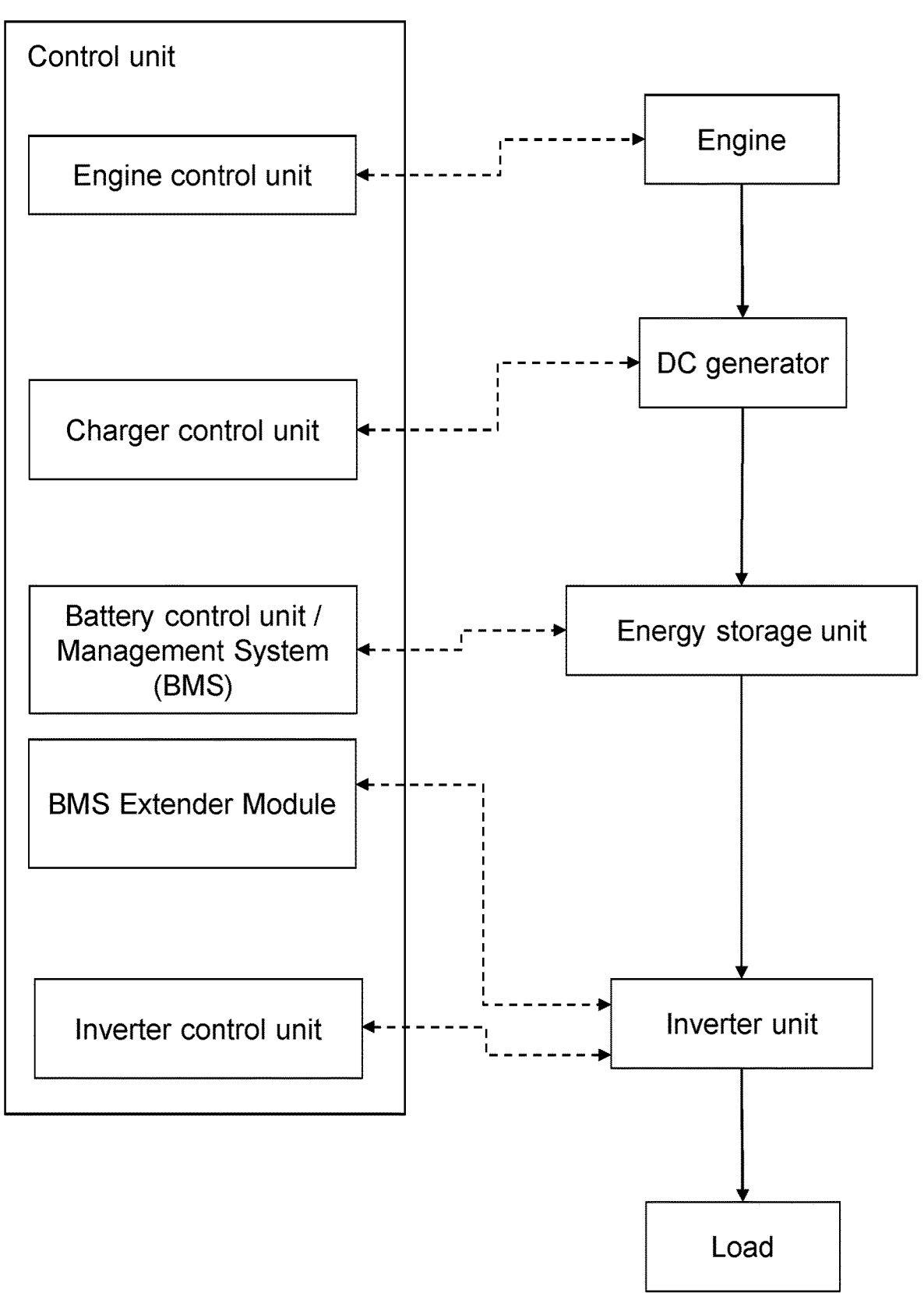

Controllers are usually an integral part of the presently disclosed hybrid generator system, in FIGS. 2 and 2A illustrated as a control unit but in practice it is a plurality of separate controllers, e.g. an engine control unit for starting and stopping the engine, a control unit for controlling the charging of the energy storage unit, a battery control unit in the form of a BMS (battery management system), a BMS extender module and an inverter control unit for controlling the inverter and thereby controlling and monitoring the output to the load.

Figure 3:
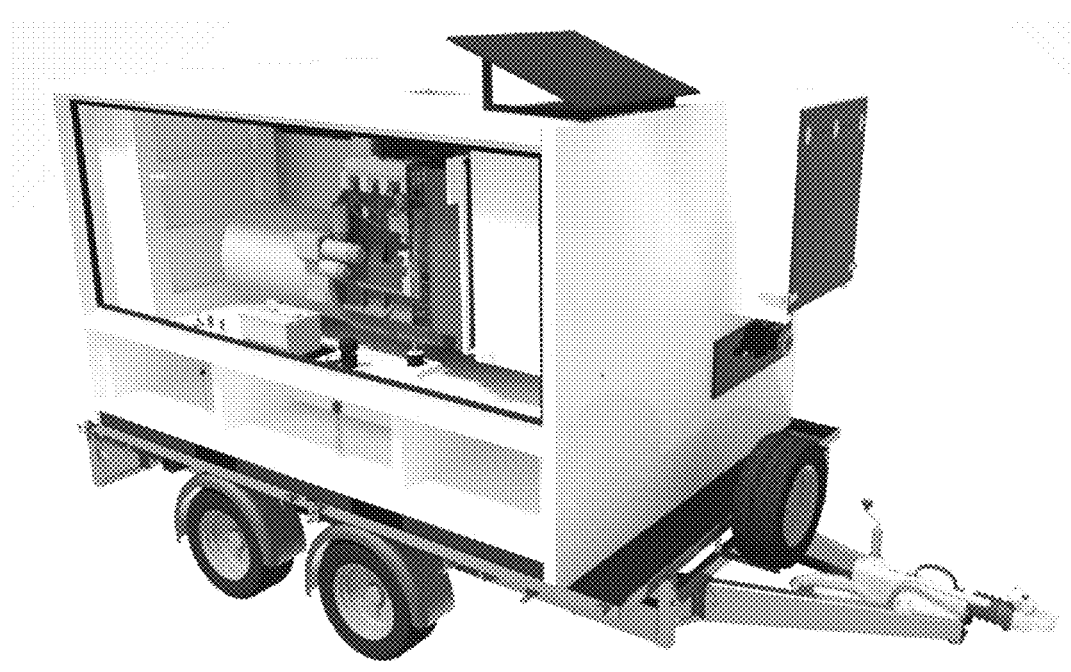
FIG. 3 shows an illustration of the housing showing the generator side of one embodiment of the presently disclosed hybrid generator system.

FIG. 3 the housing mounted on a trailer showing the engine+generator side of one embodiment of the presently disclosed hybrid generator system. The housing is built in thermoplastic in the form of high density PE. The engine is visible inside the housing and the fuel tank is integrated in the housing below, and separated from, the engine.

Figure 4:
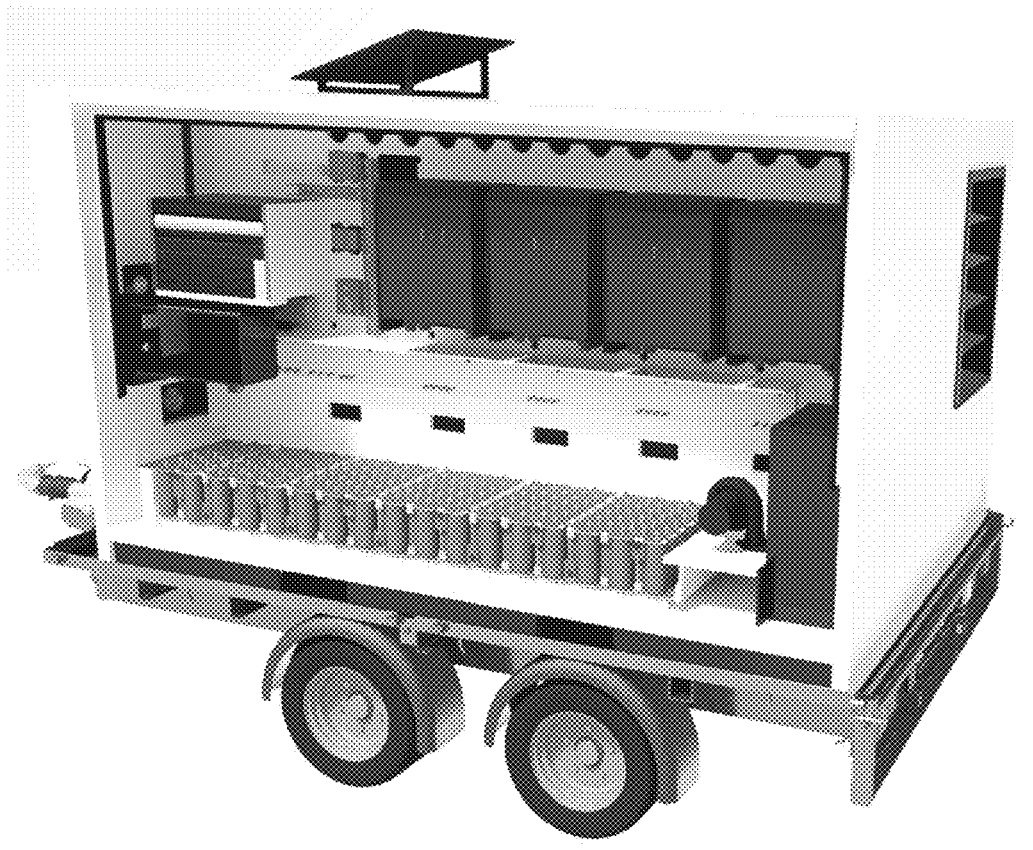
FIG. 4 shows an illustration of the housing showing the inverter+battery unit side of one embodiment of the presently disclosed hybrid generator system.

FIG. 4 shows the opposite part of the embodiment of FIG. 3 showing the inverter+battery unit side of the housing. The modularized inverter unit, with four visible 10 kVA inverter modules, is hanging on the wall and a modularized LTO battery unit is located in the bottom of the housing.

Figure 5:
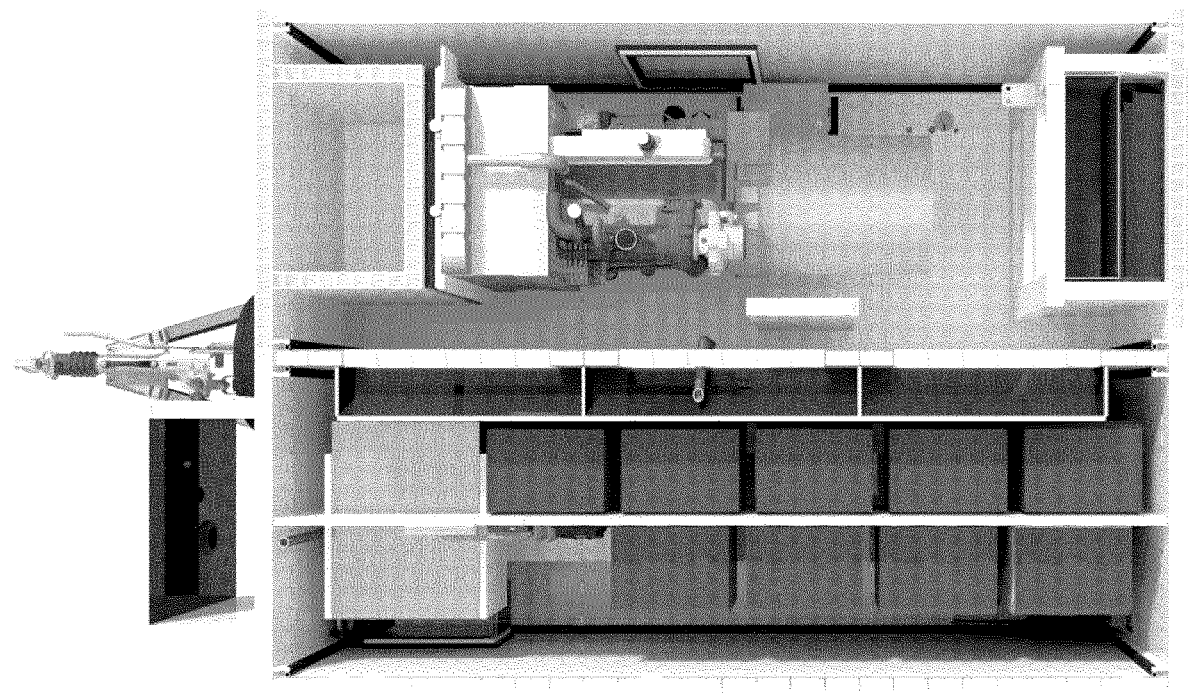
FIG. 5 shows an illustration with a top view of the housing showing both the generator side and the inverter+battery unit side of one embodiment of the presently disclosed hybrid generator system.

The embodiment of FIGS. 3 and 4 is shown from the top in FIG. 5, where it can be seen the housing is split in two "compartments", one compartment (top in FIG. 5) for the engine+generator and one compartment (bottom in FIG. 5) for the inverter modules+battery modules. The four 10 kVA inverter modules visible in FIG. 4 are also visible in FIG. 5 along with five additional 10 kVA inverter modules hanging parallel to the first four 10 kVA inverter modules providing a 90 kVA inverter unit.

Further details

1. A mobile hybrid generator system for providing grid-like AC power output to a load at off-grid locations, the hybrid generator system comprising a housing accommodating:
   a rechargeable electrical energy storage unit, such as a battery, configured to provide a DC power output,
   at least a first primary energy source, such as a combustion engine, for charging the rechargeable energy storage unit, and
   an inverter unit configured for converting the DC power output from the rechargeable energy unit to the grid-like AC power output,
   wherein the mobile hybrid generator is configured such that the grid-like AC power output is provided only from the inverter unit, both during normal mode operation and during peak power operation.

2. The mobile hybrid generator system according to item 1, configured to control start and stop of charging of the rechargeable energy storage unit by the primary energy source based on a power status of the rechargeable energy storage unit and/or based on the requirements of the load.

3. The mobile hybrid generator system according to any of the preceding items, configured such that output from the primary energy source is only used to charge the rechargeable energy storage unit.

4. The mobile hybrid generator system according to any of the preceding items, wherein the inverter unit is configured such that the AC power output matches a peak power requirement of the load.

5. The mobile hybrid generator system according to any of the preceding items, wherein the primary energy source is configured to match a normal mode requirement of the load.

6. The mobile hybrid generator system according to any of the preceding items, wherein the rechargeable energy storage unit is configured to match a predefined charging cycle.

7. The mobile hybrid generator system according to any of the preceding items, wherein the rechargeable energy storage unit is a low-voltage unit, such as 48 Volt.

8. The mobile hybrid generator system according to any of the preceding items, wherein the primary energy source is an engine powered by fluid fuel.

9. The mobile hybrid generator system according to any of the preceding items, wherein the primary energy source is a (hydrogen) fuel cell unit.

10. The mobile hybrid generator system according to any of the preceding items, wherein the primary energy source is an AC grid connection.

11. The mobile hybrid generator system according to any of the preceding items, comprising at least a second primary energy source, such as an AC grid connection.

12. The mobile hybrid generator system according to any of the preceding items, comprising a fuel tank, for holding fluid fuel, integrated in the housing, the fuel tank preferably configured for holding at least 500 litres of fuel.

13. The mobile hybrid generator system according to any of the preceding items, wherein the rechargeable energy storage unit is a battery unit.

14. The mobile hybrid generator system according to any of the preceding items, wherein the rechargeable energy storage unit is a lithium-ion battery unit, such as a lithium iron phosphate battery (LiFePO 4) battery unit, preferably a lithium-titanate battery unit.

15. The mobile hybrid generator system according to any of the preceding items, configured for integrating a renewable AC power source at the AC power output side of the inverter unit.

16. The mobile hybrid generator system according to any of the preceding items 15, configured such when the requirements from the load is less than the power output from the renewable AC power source, surplus power is used to charge the rechargeable power storage unit.

17. The mobile hybrid generator system according to any of the preceding items, configured for integrating a renewable DC power source at the input of the rechargeable power storage unit for charging the rechargeable power storage unit.

18. The mobile hybrid generator system according to any of the preceding items 8-17, configured for starting the engine a time period before charging of the rechargeable storage unit begins, such that the engine is warmed up before load of the engine begins.

19. The mobile hybrid generator system according to any of the preceding items 8-18, comprising a generator unit driven by the engine for generating AC power and a rectifier for converting the AC power from the generator unit to DC power for charging the rechargeable energy storage unit.

20. The mobile hybrid generator system according to any of the preceding items 19, wherein the frequency of the AC power output from the generator unit is different, such as 60 Hz, and independent from the frequency of the AC power output from the inverter, such as 50 Hz, and selected to optimize operation of the engine, which optionally can be driven at 1850 RPM.

21. The mobile hybrid generator system according to any of the preceding items 8-20, configured such that air intake to the engine is provided in the vicinity of the location in the housing of the inverter unit and the rechargeable energy storage unit, such that a flow of air is provided around the inverter unit and the rechargeable energy storage unit when the engine is running.

22. The mobile hybrid generator system according to any of the preceding items, wherein the inverter units comprises a plurality of inverters, such as a plurality of 10 KVA inverters.

23. The mobile hybrid generator system according to any of the preceding items, wherein the housing is (primarily) manufactured in plastics, such as high density polyethylene, which is cut-out in parts and welded together to form the housing.

24. The mobile hybrid generator system according to any of the preceding items, wherein the housing is an electrical insulator.

25. The mobile hybrid generator system according to any of the preceding items, comprising a wheeled chassis, such as a trailer, for holding the housing.

26. The mobile hybrid generator system according to any of the preceding items, wherein the at least first primary energy source comprises at least one DC voltage generator, such that the output from the first primary energy source is DC power.

27. The mobile hybrid generator system according to item 26, wherein the DC voltage generator is a permanent magnet assisted synchronous reluctance motor used as generator.

28. The mobile hybrid generator system according to any of items 26-27, wherein the DC voltage generator is configured to provide an output voltage of less than 100 Volts DC, preferably less than 75 Volts DC, more preferably less than 50 Volts DC, most preferably 48 Volts DC.

29. The mobile hybrid generator system according to any of items 26-28, wherein the DC power output from the primary energy source is configured for direct charging of the rechargeable electrical energy storage unit without a rectifier.

30. The mobile hybrid generator system according to any of items 26-29, wherein the DC voltage generator is driven by a combustion engine.

31. The mobile hybrid generator system according to any of items 26-30, wherein DC voltage generator is configured for providing a constant nominal power output of at least kW, more preferably at least 35 kW, even more preferably at least 45 kW, most preferably at least 50 kW.

32. The mobile hybrid generator system according to any of items 26-31, wherein the DC voltage generator is configured for providing a peak power output of at least 45 kW, more preferably at least 50 kW, even more preferably at least 70 kW, most preferably at least 80 kW.

The invention claimed is:

1. A mobile hybrid generator system for providing grid-like AC power output to a load at off-grid locations, the hybrid generator system comprising a housing accommodating:

a rechargeable electrical energy storage unit configured to provide a DC power output, at least a first primary energy source for charging the rechargeable energy storage unit, and an inverter unit configured for converting the DC power output from the rechargeable energy storage unit to the grid-like AC power output, wherein the mobile hybrid generator is configured such that 1) the grid-like AC power output is provided only from the rechargeable energy storage unit via the inverter unit, and 2) the output from the primary energy source is only used to charge the rechargeable energy storage unit, both during normal mode operation and during peak power operation, wherein the inverter unit is dimensioned to a peak power requirement of the load, and wherein the primary energy source is dimensioned to a normal mode requirement of the load.

2. The mobile hybrid generator system according to claim 1, configured to control start and stop of charging of the rechargeable energy storage unit by the primary energy source based on at least one of power status of the rechargeable energy storage unit or based on the requirements of the load.

3. The mobile hybrid generator system according to claim 1, wherein the rechargeable energy storage unit is configured to match a predefined charging cycle and wherein the rechargeable energy storage unit is a low-voltage unit operating at less than 50 Volt.

4. The mobile hybrid generator system according to claim 1, comprising a fuel tank for holding fluid fuel integrated in the housing, and wherein the primary energy source is a combustion engine powered by the fluid fuel.

5. The mobile hybrid generator system according to claim 1, comprising at least a second primary energy source.

6. The mobile hybrid generator system according to claim 1, wherein the rechargeable energy storage unit is a lithium-titanate battery unit.

7. The mobile hybrid generator system according to claim 1, configured for integrating a renewable AC power source at the AC power output side of the inverter unit and configured such that when the requirements from the load is less than the power output from the renewable AC power source, surplus power is used to charge the rechargeable power storage unit.

8. The mobile hybrid generator system according to claim 1, configured for integrating a renewable DC power source at the input of the rechargeable power storage unit for charging the rechargeable power storage unit.

9. The mobile hybrid generator system according to claim 4, configured for starting the engine a time period before charging of the rechargeable storage unit begins, such that the engine is warmed up before load of the engine begins.

10. The mobile hybrid generator system according to claim 4, comprising a generator unit driven by the engine for generating AC power and a rectifier for converting the AC power from the generator unit to DC power for charging the rechargeable energy storage unit, and wherein the frequency of the AC power output from the generator unit is different and independent from the frequency of the AC power output from the inverter and selected to optimize operation of the engine, which optionally can be driven at 1850 RPM.

11. The mobile hybrid generator system according to claim 4, configured such that air intake to the engine is provided in the vicinity of the location in the housing of the inverter unit and the rechargeable energy storage unit, such that a flow of air is provided around the inverter unit and the rechargeable energy storage unit when the engine is running.

12. The mobile hybrid generator system according to claim 1, wherein the housing is primarily manufactured in plastics which is cut-out in parts and welded together to form the housing such that the housing is an electrical insulator.

13. The mobile hybrid generator system according to claim 1, comprising a wheeled chassis for holding the housing.

14. The mobile hybrid generator system according to claim 1, wherein the at least first primary energy source comprises at least one DC voltage generator, such that the output from the first primary energy source is DC power.

15. The mobile hybrid generator system according to claim 14, wherein the DC voltage generator is a permanent magnet assisted synchronous reluctance motor used as generator.

16. The mobile hybrid generator system according to claim 14, wherein the DC voltage generator is configured to provide an output voltage of less than 100 Volts DC, or less than 75 Volts DC, or less than 50 Volts DC, or 48 Volts DC.

17. The mobile hybrid generator system according to claim 14, wherein the DC power output from the primary energy source is configured for direct charging of the rechargeable electrical energy storage unit without a rectifier.

18. The mobile hybrid generator system according to claim 14, wherein the DC voltage generator is driven by a combustion engine.

19. The mobile hybrid generator system according to claim 14, wherein DC voltage generator is configured for providing a constant nominal power output of at least 30 kW, or at least 35 kW, or at least 45 kW, or at least 50 kW.

20. The mobile hybrid generator system according to claim 14, wherein the DC voltage generator is configured for providing a peak power output of at least 45 kW, or at least 50 kW, or at least 70 kW, or at least 80 kW.

21. The mobile hybrid generator system according to claim 1, wherein the rechargeable electrical energy storage unit is a battery, and wherein the at least first primary energy source is a combustion engine.

22. The mobile hybrid generator system according to claim 4, wherein the fuel tank is configured for holding at least 500 litres of liquid fuel.

23. The mobile hybrid generator system according to claim 5, wherein the at least second primary energy source is an AC grid connection.

24. The mobile hybrid generator system according to claim 1, wherein the housing is primarily manufactured in high density polyethylene, which is cut-out in parts and welded together to form the housing such that the housing is an electrical insulator.

* * * * *